US006975638B1

(12) United States Patent
Chen et al.

(10) Patent No.: US 6,975,638 B1
(45) Date of Patent: Dec. 13, 2005

(54) INTERLEAVED WEIGHTED FAIR QUEUING MECHANISM AND SYSTEM

(75) Inventors: Yao-Min Chen, San Jose, CA (US); Heeloo Chung, San Francisco, CA (US); Zhijun Tong, Fremont, CA (US); Eugene Lee, San Jose, CA (US)

(73) Assignee: Force10 Networks, Inc., Milpitas, CA (US)

( * ) Notice: Subject to any disclaimer, the term of this patent is extended or adjusted under 35 U.S.C. 154(b) by 797 days.

(21) Appl. No.: 09/687,762

(22) Filed: Oct. 13, 2000

(51) Int. Cl.[7] ............................. H04L 12/26; H04J 1/16; G08C 15/00; G06F 11/00
(52) U.S. Cl. ....................... 370/412; 370/232; 370/395; 709/235
(58) Field of Search ................................. 370/395–429, 370/465–468, 232–259; 709/229–232, 235

(56) References Cited

U.S. PATENT DOCUMENTS

| | | | | |
|---|---|---|---|---|
| 5,166,930 A | * | 11/1992 | Braff et al. | 370/235 |
| 6,031,822 A | * | 2/2000 | Wallmeier | 370/235 |
| 6,092,115 A | * | 7/2000 | Choudhury et al. | 709/235 |
| 6,295,295 B1 | * | 9/2001 | Wicklund | 370/392 |
| 6,317,416 B1 | * | 11/2001 | Giroux et al. | 370/232 |
| 6,389,019 B1 | * | 5/2002 | Fan et al. | 370/395.42 |
| 6,434,631 B1 | * | 8/2002 | Bruno et al. | 710/6 |
| 6,452,933 B1 | * | 9/2002 | Duffield et al. | 370/415 |
| 6,501,762 B1 | * | 12/2002 | Pillar et al. | 370/412 |
| 6,654,374 B1 | * | 11/2003 | Fawaz et al. | 370/394 |
| 6,674,718 B1 | * | 1/2004 | Heddes et al. | 370/230 |
| 6,678,248 B1 | * | 1/2004 | Haddock et al. | 370/235 |
| 6,680,933 B1 | * | 1/2004 | Cheesman et al. | 370/352 |
| 6,771,652 B1 | * | 8/2004 | Aydemir et al. | 370/412 |

OTHER PUBLICATIONS

Cisco Systems; *Internetworking Technology Overview;* Jun. 1999; Chapter 46, pp. 1-18.

* cited by examiner

*Primary Examiner*—Man U. Phan
*Assistant Examiner*—Marcia Gordon
(74) *Attorney, Agent, or Firm*—Haynes and Boone, LLP

(57) ABSTRACT

Methods and apparatus for interleaved weighted fair data packet queue sequencing are disclosed. An interleaving table specifies a queue sequence. A queue sequencer follows the table order on an epoch-by-epoch basis, selecting a queue for each epoch based on the table order. If the selected queue does not have enough data to fill its epoch, the sequencer can step to the next queue in the table order. Because the table is interleaved, higher-priority queues can be visited frequently, improving jitter and latency for packets associated with these queues. The table structure allows all queues at least some portion of the available output bandwidth, and can be organized to afford some queues a much larger portion without having those queues monopolize the output stream for inordinate amounts of time.

In some embodiments, each table entry has a programmable epoch value associated with it. The epoch value can be used to weight each table entry respective to the other entries.

25 Claims, 9 Drawing Sheets

**Fig. 1
(Prior Art)**
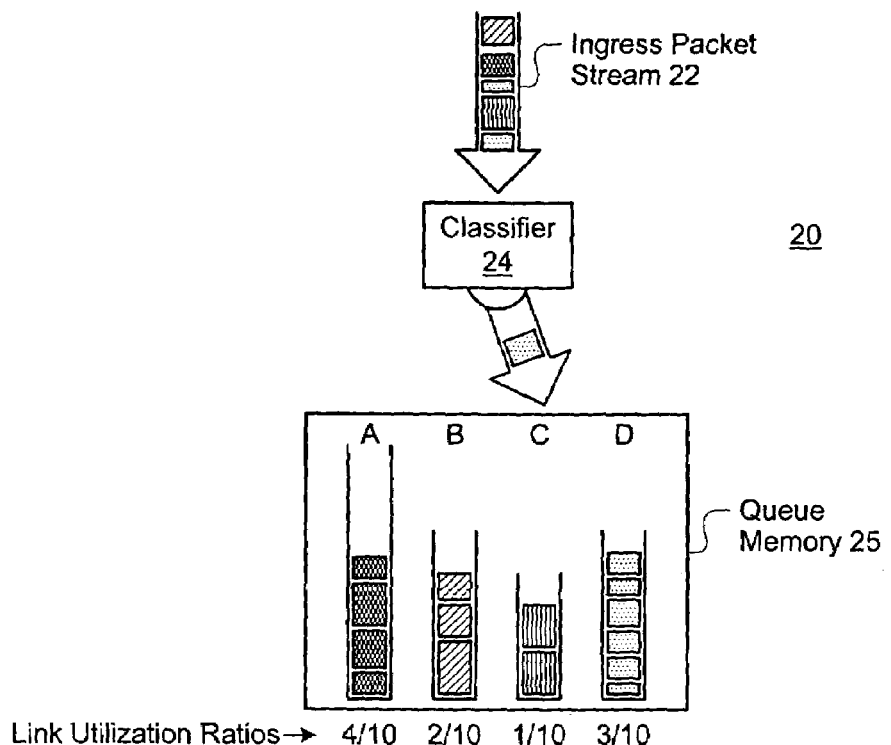
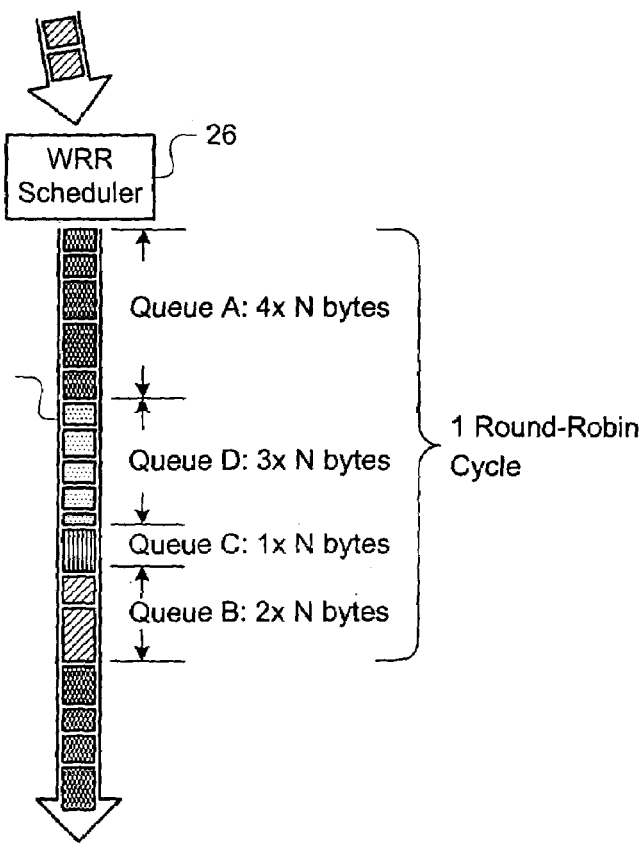

INTERLEAVED WEIGHTED FAIR QUEUING MECHANISM AND SYSTEM

FIELD OF THE INVENTION

This present invention relates to data packet routing and routers, and more particularly to a method and apparatus for scheduling packets from multiple queues.

BACKGROUND OF THE INVENTION

In packet-switched networks, routers, switches, and gateways are examples of the types of network devices that effect delivery of packets from source endpoints to destination endpoints. These routing devices receive network packets at one or more ingress ports. For each received packet, the routing device examines one or more of the packet's headers and then determines an egress port that will move the packet most effectively towards its destination. The device switches the packet to that egress port, where it will be placed back on the network to wend its way towards the destination endpoint.

Routing devices generally place a packet in an internal queue until the packet can be switched to the appropriate egress port, and/or until the egress port has transmitted earlier-arriving packets. One simple way to implement an internal queue is with a single FIFO (first-in, first-out) buffer. The main drawback of this method is that it cannot prioritize one type of traffic differently than any others; for instance, a burst of low-priority traffic from one source will delay higher-priority traffic arriving slightly later in time, merely because the low-priority traffic entered the FIFO buffer first.

Several multiple-queue schemes have been devised to allow more intelligent prioritization of queued packets. In some of these schemes, a classifier assigns a priority to each arriving packet, and sends the packet to a FIFO queue dedicated to the traffic class that includes all packets with that priority. For instance, FIG. 1 shows an ingress packet stream 22, each packet in the stream representing one of four different classes as indicated by the symbolic shading applied to each packet in stream 22. Classifier 24 "sorts" the packets by class into one of four FIFO queues A, B, C, D in queue memory 25.

Once packets have been classified and assigned to appropriate queues, a scheduler recombines the packets into an egress packet stream. "Priority queuing" (PQ) is perhaps the most straightforward way of doing this. With PQ, queues are ranked highest to lowest in priority. Anytime that a packet waits in the highest-priority queue, it will be serviced next. When the highest-priority queue is empty, the next-highest priority queue is serviced exclusively until it is also empty, and so on. This technique works well for higher-priority traffic, but provides no guarantee as to when, if ever, lower-priority traffic will receive service.

Scheduler 26 of FIG. 1 provides an alternative to PQ, known as "weighted round robin" (WRR) queuing. WRR assigns a target link utilization ratio (LUR) to each queue. For instance, in FIG. 1, queue A has an LUR of 4/10, meaning that queue A receives 40% of the bandwidth on egress packet stream 28. WRR scheduler 26 visits each queue in memory 24 in round-robin fashion, dwelling long enough on each queue to dequeue a number of bytes from that queue proportional to that queue's LUR. For instance, the value N in FIG. 1 could be set to 3000 bytes. Using the queue LUR values, scheduler 26 dequeues 12,000 bytes from queue A, then 6000 bytes from queue B, then 3000 bytes from queue C, and finally 9000 bytes from queue D. The scheduler then returns to queue A and repeats the process.

Another alternative to PQ and WRR is "weighted fair queuing" (WFQ). A WFQ scheduler uses a flow-based classification technique. That is, instead of lumping all packets into one of several classes, packets are classified according to their source and destination address and port, upper-layer protocols, etc., such that packets from the same end-to-end packet "flow" or "stream" are placed in a queue unique to that flow. WFQ can weight each flow according to that flow's class or quality-of-service—in general, however, packets from low-volume streams propagate quickest through WFQ scheduling, and high-volume streams share the remaining bandwidth fairly.

SUMMARY OF THE INVENTION

The capability of high-performance routers, in terms of routed packets-per-second, continues to expand, in part because of fundamental changes in the basic processes that go on in a router—changes such as those that allow parallel processing and pipelining. For instance, one method of operating a high-performance router efficiently is to abandon attempts to switch packets individually through the router's switching core. Instead, the router can exploit its high raw throughput by reconfiguring its switching core only periodically, e.g., at fixed time intervals, or epochs. During each epoch, many packets with a common switching core input port and a common switching core output port can pass through the switching core, on pathways that remain in place for that epoch. This greatly simplifies the operation of a high-speed switching core, as compared to packet-by-packet switching.

With an epoch-based approach to switching and extremely high router throughput, prior methods of queuing and scheduling begin to prove inadequate. Some, such as WFQ, can require a prohibitive number of computations/packet. Others, such as WRR, can cause excessive delay if implemented in an epoch-based router. Thus a new scheduling methodology, termed Interleaved Weighted Fair Queuing (IWFQ) in this disclosure, has now been designed to operate with epoch-based switching. IWFQ can work alone, e.g., when serving a physical egress port, or as part of a two-stage scheduling process. In the two-stage process, the first stage schedules the switching core configuration for each epoch, matching switching core inputs and outputs according to some fairness criteria. The second stage then determines, for a given epoch's switching core configuration, which queue or queues will be scheduled to transmit to the core during that epoch. The second stage accomplishes its function via reference to an interleaving table. Preferably, this table is utilized to allow weighted scheduling of queues at the second stage, without having the router dwell on any one queue for too many epochs before other queues are serviced.

In one aspect of the present invention, an integrated circuit comprising a scheduler is disclosed. The scheduler comprises a programmable interleaving table. Each table entry can identify a queue with an epoch value. The scheduler also has a pointer register capable of identifying a current entry in the interleaving table. A queue sequencer supplies, for each epoch, a queue identifier based on the current entry in the interleaving table. The sequencer charges the current entry for use of the epoch, and steps the pointer register to a next table entry when the current entry has been charged with use of a number of epochs set aside for that entry.

In another aspect of the invention, a method of scheduling packets from multiple queues onto a common output packet stream is disclosed. A programmable interleaving table, as well as a pointer to a current table entry in the interleaving table, are maintained. For each epoch in a sequence of epochs (which may not be consecutive), packets are scheduled onto the output packet stream from the queue identified with the current table entry. The current table entry is charged for use of the epoch. The pointer is moved to a next table entry when the current table entry has been charged with use of a number of epochs set aside for that entry. The method may be performed by hardware, software, or a mixture of the two. In this respect, a further aspect of the invention is an apparatus comprising a computer-readable medium containing computer instructions that, when executed, cause a processor or multiple communicating processors to perform a method according to the invention.

In yet another aspect of the invention, a packet routing device is disclosed. The device comprises a multiple input port/multiple output port switching fabric. The fabric is capable of reconfiguration on an epoch-by-epoch basis to transmit packets according to an input port-to-output port mapping specified for each epoch. Each input port is connected to a corresponding input packet buffer. Each input packet buffer can receive packets from a queue memory capable of supporting multiple sets of queues. Each set of queues can correspond to one of the switching fabric output ports. Also associated with each input packet buffer is a memory capable of configuration as a set of interleaving tables, with at least one interleaving table per output port. Within each interleaving table, each interleaving table entry is identified with one of the packet queues from the set of queues specified for the output port corresponding to that interleaving table. Also associated with each input packet buffer is a queue sequencer. The queue sequencer selects, for each epoch, at least one queue, from the set corresponding to the output port mapped to that input packet buffer during that epoch, to supply packets to the input packet buffer during that epoch. The queue sequencer selects the queue identified with a current entry in the interleaving table associated with that input packet buffer and the mapped output port.

BRIEF DESCRIPTION OF THE DRAWING

The invention may be best understood by reading the disclosure with reference to the drawing, wherein:

FIG. 1 illustrates weighted round robin scheduling according to the prior art;

DETAILED DESCRIPTION OF THE PREFERRED EMBODIMENTS

Several terms have been assigned particular meanings within the context of this disclosure. As used herein, something that is "programmable" can have its value electronically changed through a computer interface, without requiring manual alteration of a circuit, recompilation of software, etc. A "table" is a data structure having a list of entries, each entry identifiable by a unique key or index and containing a value related to the key and/or several related values. A table requires physical memory, but a table is not limited to any particular physical memory arrangement. As applied to a table, a "pointer" is a value that allows a specific table entry to be identified. An "epoch" is a set unit of time within a device, but an "epoch" need not represent the same unit of time at all points within a single device. "Interleaved" queue sequencing refers to a repeatable queue sequence that intersperses multiple visits to one queue among visits to other queues. A "packet-routing device" is a multi-port device that performs packet switching between its ports. Routers, switches, access concentrators, and gateways are common examples of packet routing devices.

Figure 2:
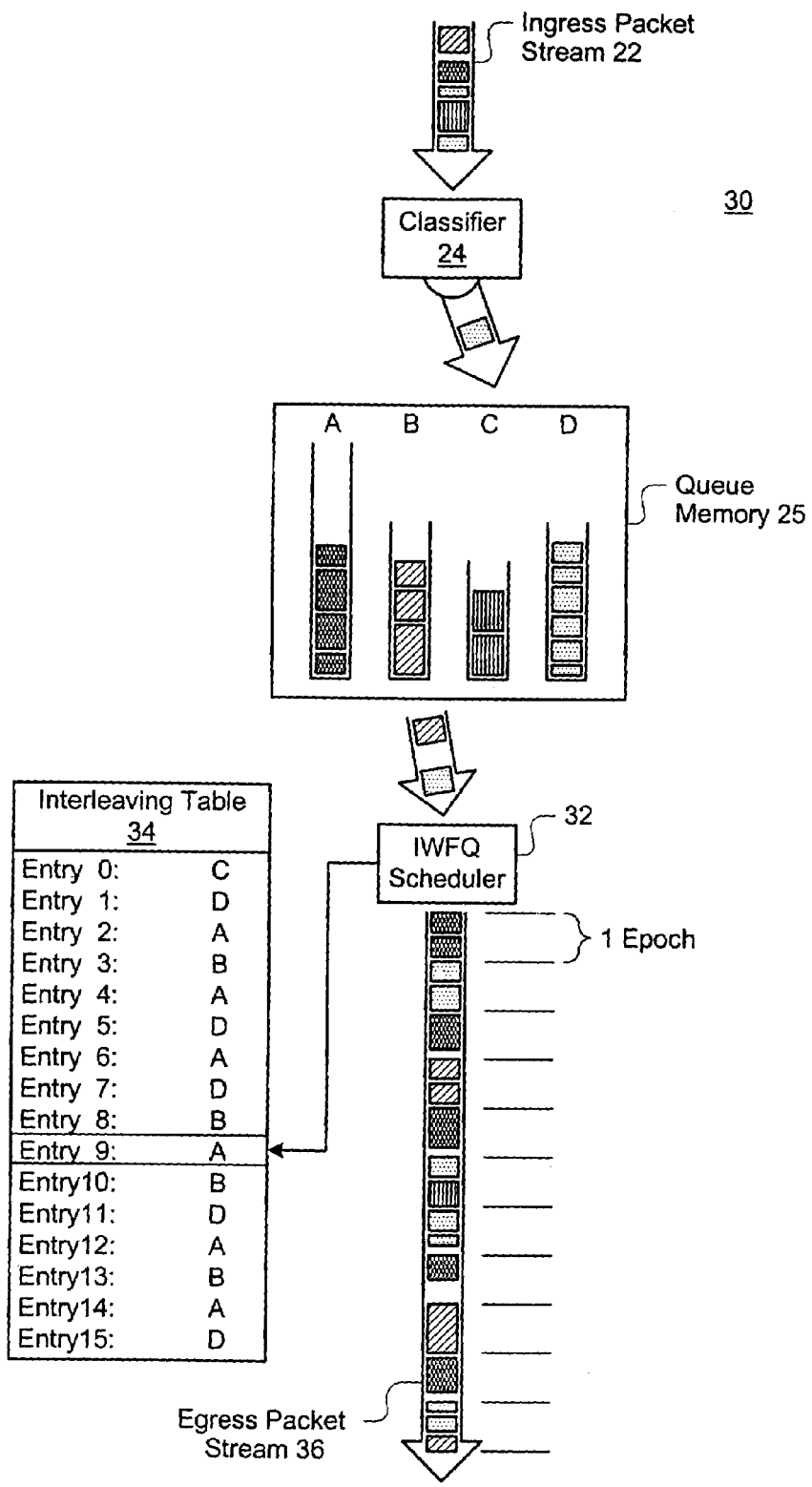
FIG. 2 illustrates the basic concept of IWFQ scheduling.

FIG. 2 illustrates the basic concept for operation of an IWFQ scheduler 32. IWFQ scheduler 32 determines, on an epoch-by-epoch basis, whether it will forward packets from queue A, B, C, or D to egress packet stream 36. To make this determination, IWFQ scheduler 32 reads a current entry from interleaving table 34. For instance, in FIG. 2, interleaving table 34 has 16 entries, Entry 0 to Entry 15. Entries 7 and 8 were used, most recently, to select packets (shown heading into IWFQ scheduler 32) for the last two epochs; IWFQ is now looking at Entry 9 and is getting ready to accept packets from queue A during the next epoch.

Use of interleaving table 34 provides several benefits, the first of which is operational simplicity. The scheduler simply reads packets during each epoch from the queue identified with the current table entry, and loops repeatedly through the table. The scheduler need not collect statistics on packets or queues, track how many bytes have been transmitted by a particular queue, etc., and can therefore operate at high speed, even when hundreds of queues exist.

Another benefit of IWFQ scheduling is that it avoids the potential quality-of-service (QoS) problems inherent in a WRR approach with a large number of queues—problems that could be exacerbated were WRR to be implemented with epoch-based processing. These problems can cause excessive latency and/or interarrival jitter in all packet streams—even those streams that should receive high QoS.

Still another benefit is that IWFQ has the potential to provide what is best about PQ and WRR, while avoiding what can be some of the greatest drawbacks to each. For instance, one of the benefits of PQ is that high-priority queues always receive fast service, whereas with WRR high-priority queues are only served once each round-robin cycle. With IWFQ, high-priority queues can be identified with multiple entries placed at many points throughout the table, such that high-priority queues get serviced frequently as they do with PQ. At the same time, IWFQ provides a WRR-like benefit—IWFQ allows each queue's link utilization to be controlled by the number of times that queue appears in the table (and in some embodiments, the weight assigned to each table instance).

An additional benefit of interleaved service is that because high-priority queues can be serviced frequently, queue depth can usually be decreased as compared to WRR.

With the basic concept of IWFQ in hand, the discussion next proceeds to a description of a preferred packet-routing device embodiment encompassing IWFQ.

Figure 3:
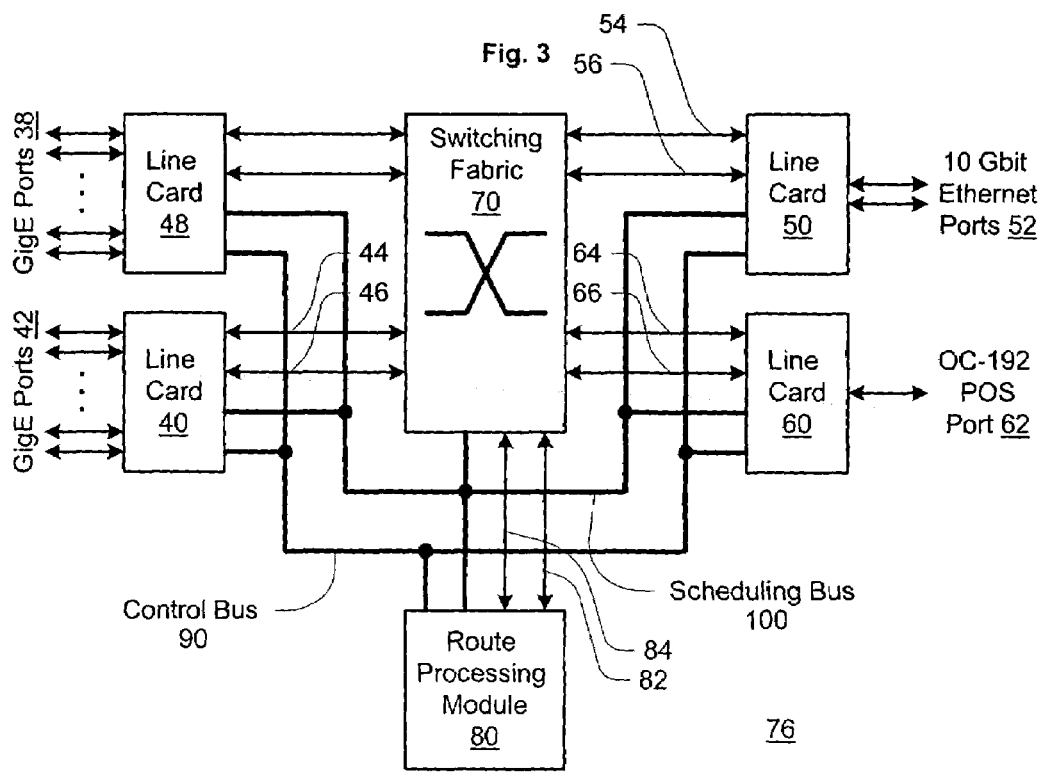
FIG. 3 contains a high-level block diagram for a router that can benefit from IWFQ scheduling.

FIG. 3 shows a high-level block diagram for a packet-routing device 76. Line cards 40, 48, 50, and 60 provide physical ports to the device. For instance, line card 40 can provide up to 24 Gigabit Ethernet ports 42 to device 76, and line card 48 can provide similar capabilities. Line card 50 provides two 10-Gigabit Ethernet ports 52, and line card 60 provides an OC-192 POS (Packet-Over-Sonet) port 62. Although four line cards are shown, many systems provide slots to accommodate many more cards, e.g., up to fourteen line cards in one embodiment. The user can configure device 76 to accommodate different traffic models and physical port mixes by the appropriate selection of line cards.

Switching fabric 70 moves each data packet from that packet's ingress port/line card to that packet's egress port/line card. Switching fabric 70 connects to each line card through two switching fabric port connections (see, e.g., port connections 44, 46 to line card 40, port connections 54, 56 to line card 50, and port connections 64, 66 to line card 60). Switching fabric 70 can be rapidly reconfigured from epoch to epoch, e.g., at one epoch, it may be switching packets from ingress port 44 to egress port 54 and from ingress port 46 to egress port 66, and at the next instant, it could be switching packets from ingress port 44 to egress port 64. At the same time, packets from ingress port 54 could be routed to egress port 46, and packets from ingress port 64 could be routed to egress port 44, for example. Route processing module (RPM) 80 has several duties. RPM 80 is responsible for overall system operation, i.e., recognizing and booting new line cards, identifying faulty line cards, packet route discovery, and sharing routing table information with the line cards. RPM 80 also provides a user interface to allow a system operator to configure the system and view system parameters. For each of these functions, RPM 80 generally communicates with the line cards over control bus 90.

Another duty of RPM 80 is scheduling switching fabric 70. In a preferred implementation, switching fabric 70 is reconfigured by RPM 80 every epoch. RPM 80 uses scheduling bus 100 to communicate to switching fabric 70 and to line cards 40, 48, 50, 60 the switching fabric configuration for the upcoming epochs. RPM 80 attempts to schedule as many fabric ports as possible during each epoch, and to ensure that data is handled promptly and fairly.

RPM 80 also maintains its own switching fabric port connections 82, 84, allowing it to receive and transmit packets using any of the line card physical ports. Note that RPM 80 may not require two switching fabric port connections as illustrated, and a redundant RPM 80 may also be connected to device 66 to provide failover capability.

Figure 4:
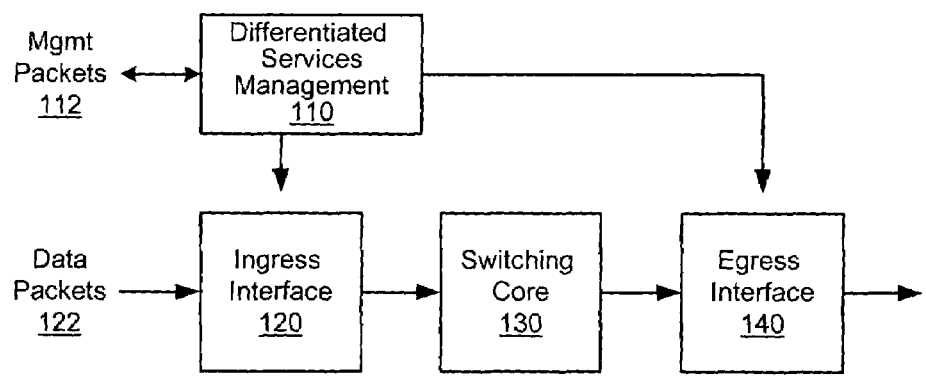
FIG. 4 shows where differentiated services are applied in such a router.

FIG. 4 illustrates how the concept of "differentiated services management" can be applied in a packet routing device such as device 76. Differentiated services management block 110 is a software process running on RPM 80. Block 110 receives management packets 112 containing instructions as to how packets associated with the various ports of device 20 should be treated. For instance, each port can have committed and peak data rates for its service contract. The instructions may further specify how different classes of packets are to be prioritized, both in drop priority and in queue priority. With the present invention, port scheduling tables can also be provisioned so as to differentiate class treatment during scheduling, on a port-by-port basis. Management block 110 implements the instructions by setting appropriate parameters in ingress interface 120 and egress interface 140. Typically, each switching fabric port connection will have at least one such ingress interface and at least one such egress interface. Note that high-performance switching core 130, e.g. comprising switching fabric 70, preferably is unaware of any differential treatment that should be applied to the traffic reaching that core. This allows core 130 to be highly optimized for throughput.

Figure 5A:
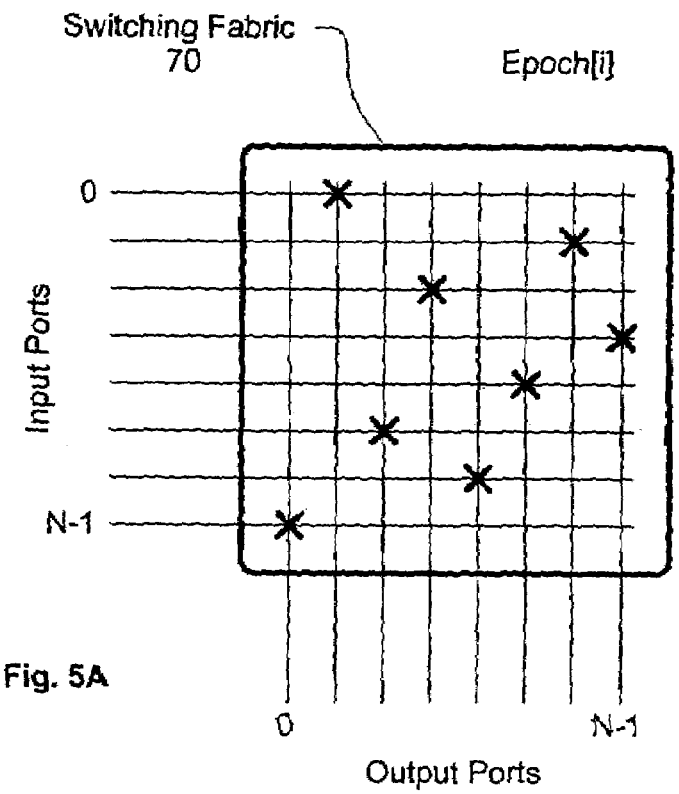
FIGS. 5A and 5B present, conceptually, a crossbar-type switching fabric as it might appear in two consecutive epochs.
Figure 5B:
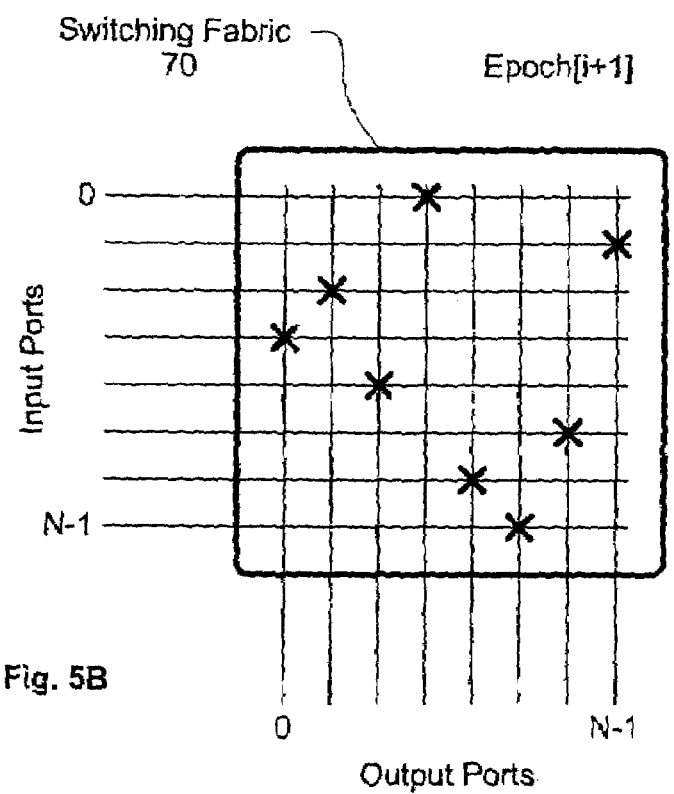

An example of switching fabric operation is shown in FIGS. 5A and 5B. In these figures, switching fabric 70 is depicted as a simple "crossbar" switch. The crossbar switch has N input ports and N output ports (the number of input and output ports is preferably, but not necessarily, equal). Each input port connects to each output port at a switching point (a large X indicates the active switching points in FIGS. 5A and 5B).

During each epoch, fabric 70 is configured to pass data according to an input port-to-output port mapping specified for that epoch. For instance, at Epoch[i], input port 0 maps to output port 1, and at Epoch[i+1], input port 0 maps to output port 3. Of course, it is also possible to map one input port to multiple output ports, e.g., to broadcast from one input port to all ports, or to multicast a packet to several output ports. In a given epoch, one or more input ports and/or output ports may remain unmatched. Preferably, however, a given input port and a given output port will not both sit idle during an epoch if that input port has data to send to that output port.

Figure 6:
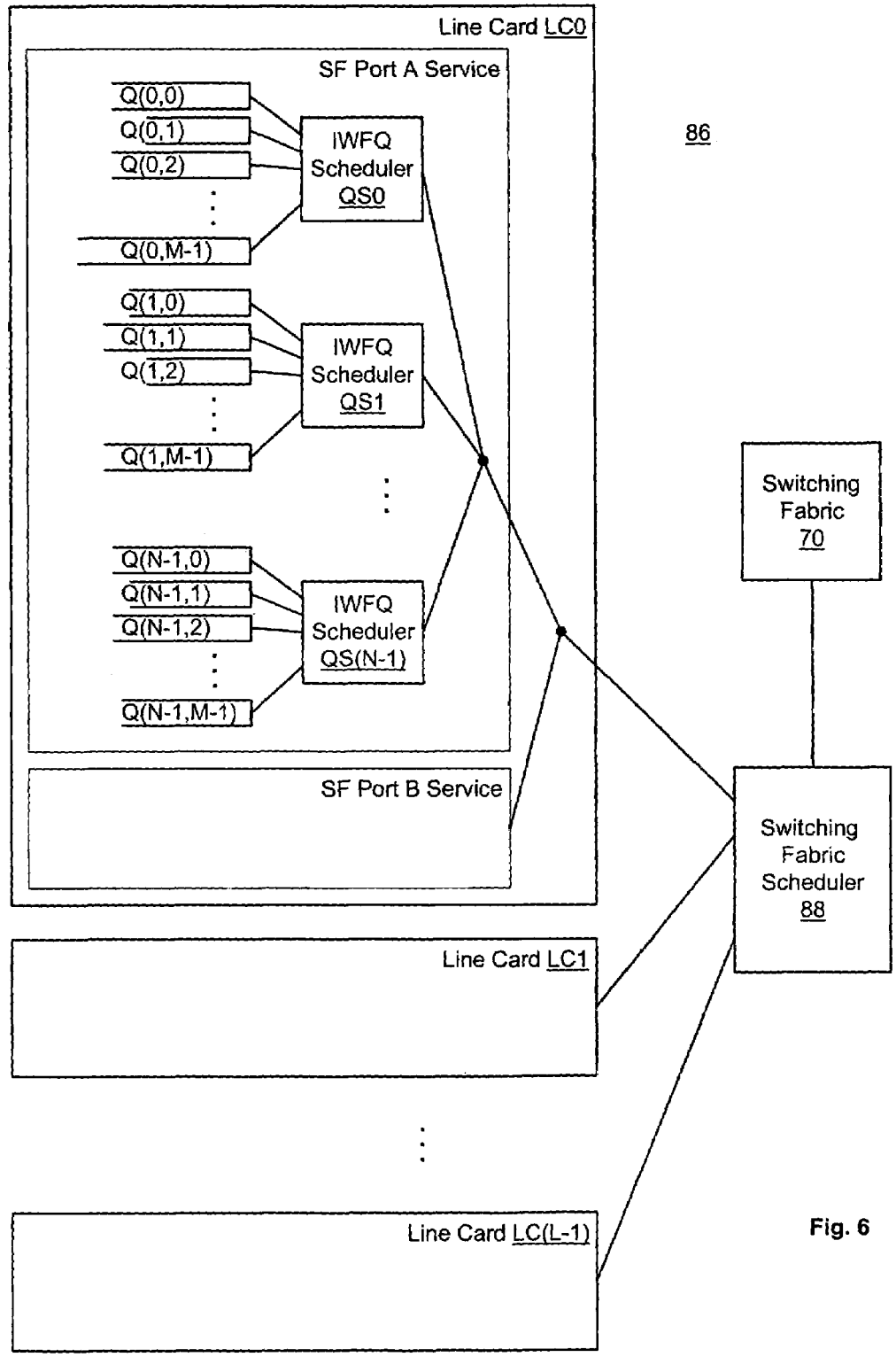
FIG. 6 shows, conceptually, two-tiered packet scheduling according to epochs.

FIG. 6 shows, conceptually, how a switching fabric scheduler 88 and multiple IWFQ schedulers interact in a two-tiered scheduling approach. Switching fabric scheduler 88 resides on RPM 80 (see FIG. 3), and communicates over the scheduling bus with each of L line cards LC0, LC1, . . . LC(L-1). Each line card has two switching fabric ingress port connections, and has separate circuitry (SF Port A Service, SF Port B Service) for each of the port connections. Within each service, a bank of N IWFQ schedulers QS0, QS1, . . . QS(N-1) is configured, one scheduler for each switching fabric egress port. Each IWFQ scheduler QSn is associated with M packet queues Q(n, 0), Q(n, 1), . . . Q(n,M-1), where n is one of the N switching fabric egress ports and M is the number of traffic classes.

Top-tier scheduling is as follows, with reference to LC0, SF Port A Service (other line cards operate similarly). When a packet queue Q(n, m) has data to transmit, its associated scheduler QSn sends a request to switching fabric scheduler 88. Switching fabric scheduler 88 grants the request, and scheduler QSn acknowledges by accepting the grant. Scheduler 88 then schedules the request for a given switching fabric epoch. During scheduling, the request must contend with requests from the other IWFQ schedulers of LC0, Port A for use of the attached switching fabric ingress port. The request must contend as well as with requests from the QSn schedulers of other line cards and ports, as those schedulers also attempt to transmit to switching fabric egress port n.

Switching fabric scheduler 88 arrives at a switching fabric ingress port-to-egress port mapping for each epoch. The exact method of determining the mapping is not critical to the instant invention; however, some factors that can be used by scheduler 88 to arrive at a decision include the length of time that a requested mapping has been pending, the average traffic class for the packets corresponding to a particular IWFQ scheduler, how full a particular IWFQ scheduler's buffers are, etc. In general, fabric scheduler 88 will use a fairness criteria based on one or more of these—or similar factors—to produce a mapping.

Fabric scheduler 88 communicates the mapping for each epoch to the line cards before that epoch actually arrives. During Epoch[i-2], Line Card 1, Port A receives notification of the egress port n that it will connect to during Epoch[i]. During Epoch[i-1], LC0, Port A is expected to fill a buffer with packet data bound for egress port n. Switching fabric 70 will then empty that buffer during Epoch[i]. It is up to IWFQ scheduler QSn to determine which of its M associated queues shall be used to fill the buffer during Epoch[i-1].

Figure 7:
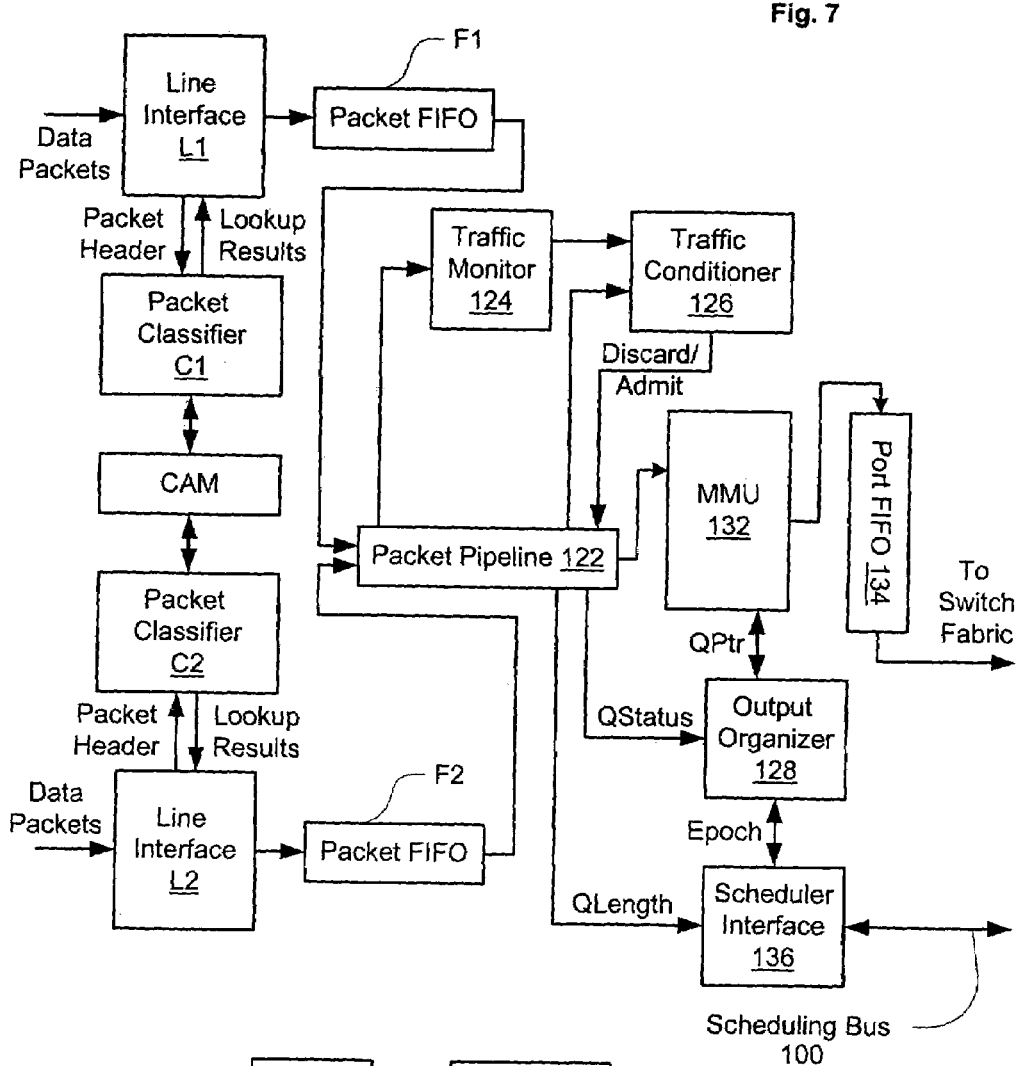
FIG. 7 shows a block diagram for a packet ingress interface.

FIG. 7 illustrates a more-detailed block diagram for ingress interface 120 of FIG. 4, e.g., as implemented on line card 40 for switching fabric port connection 44. (other line card implementations would be similar). In particular, only two line interfaces, L1 and L2, are shown, although line card 40 is described as having twelve such interfaces per switching fabric connection. Two interfaces are sufficient to illustrate which circuitry is and is not replicated per-port, and thus the other ten interfaces have been omitted for clarity. In line ard 50 or 60, line interface L2 and its related circuitry would not be needed, as each line interface is served by a dedicated switching fabric port connection.

Initial processing of a packet by ingress interface 120 is as follows. When a packet begins to arrive at line interface L1, packet classifier C1 receives the packet header, and uses selected header fields to perform a lookup operation in the CAM (Content-Addressable Memory). The CAM lookup returns both the switching fabric egress port SPort to the destination line card and the destination port on that line card. Several packet classification parameters are also determined during lookup: traffic class, or queuing priority (QP), which will be used to assign the packet to one of eight queues associated with the SPort; ODSCP (Outgoing Differentiated Services Code Point), which is a differentiated services header field that is to be inserted in the packet before it leaves the routing device; and drop precedence (DP), which is used to differentiate the drop priority for packets sharing the same queue. The drop priority DP preferably takes one of three values corresponding to the "colors" Green, Yellow, and Red. Red packets will generally be dropped before Yellow packets, and Yellow packet will generally be dropped before Green packets. The lookup results are bundled in an internal-use header and prepended to the data packet in packet FIFO F1. Note that packets arriving at line interface L2 experience a similar process, but with classifier C2, FIFO F2, and the shared CAM.

Packets in FIFOs F1 and F2 compete for admission to packet pipeline 122, and are admitted based on a round-robin admission policy with a cap on admitted bytes per FIFO per round. Once a packet is admitted to packet pipeline 122, traffic monitor 124 snoops the packet's DP, QP and IPort (i.e., either L1 or L2 in this example).

Traffic monitor 124 uses dual token buckets to classify the packet according to the packet's DP (if preexisting), QP, and IPort. The first token bucket detects whether traffic from the packet's particular class (QP) and IPort is exceeding a peak rate. The second token bucket detects whether traffic from the packet's particular class and IPort is, although not exceeding a peak rate, exceeding a longer-term committed information rate. If the packet violates either peak or committed rate, traffic conditioner 126 is notified via an appropriate Out-Of-Profile signal (Peak OOP and Comt OOP, respectively).

Traffic conditioner 126 receives rate violation notification from traffic monitor 124, and snoops the packet's DP, QP, and switching fabric egress port from packet pipeline 122. Traffic condition 126 implements a DSCP Marking Function (DMF), which may increase a packet's DP before RED processing. The DMF is a lookup table indexed by the packet's original DSCP, DP, QP, Peak OOP, Comt OOP, and source port ID (ingress mode) or destination port ID (egress mode), and is populated with new DSCP values for each valid index.

In addition, the DMF also computes a new DP value from the original DP value, Peak OOP, and Comt OOP. If the original drop priority for a packet is Green or Yellow and Peak OOP is set, the new DP value is changed to Red; otherwise, a Green DP is changed to Yellow if Comt OOP is set. When neither Peak OOP nor Comt OOP is set, the new DP is set to the original DP.

Conditioner 126 produces a discard/admit signal back to packet pipeline 122, e.g., using a random early detection algorithm that senses impending congestion in the packet's assigned queue. Preferably, conditioner 126 implements a different drop probability profile for each DP color, and different queues can also have different drop probability profiles. If the signal back to packet pipeline has a value understood as drop, packet pipeline 122 may use the signal to discard the packet before it reaches Memory Management Unit (MMU) 132, or it may simply mark the packet to indicate congestion. Otherwise, when the packet reaches the end of the queue, it will be queued in MMU 132 according to the packet's switching fabric egress port and QP.

Memory Management Unit 132 comprises a queue memory, buffer memory, and logic necessary to add packet to the tail of each queue and dequeue packets from the head of each queue.

Packet pipeline 122 tracks the size of each queue in MMU 132, i.e., when a packet is de-queued into Port FIFO 134, pipeline 122 decrements a value CQS (Current Queue Size) by the packet's size, and when a packet is queued to memory 132, pipeline 122 increments CQS by the packet's size. Updates to CQS for each queue are supplied to traffic conditioner 126. CQS vales are also supplied via the signal QLength to scheduler interface 136.

Pipeline 122 also updates a value QStatus each time a packet enters or leaves MMU132. QStatus contains one bit corresponding to each queue in MMU 132, e.g., for N=32 output ports and M=8 traffic classes, 256 queues exist and QStatus therefore has 256 bits. A value of 0 for a specific bit indicates that the corresponding queue is empty and a value of 1 indicates that that queue is holding at least one packet.

Scheduler interface 136 communicates with the system's switching fabric scheduler 88 (FIG. 6) across scheduling bus 100, telling scheduler 88 via a weight or priority signal which fabric egress ports that ingress interface 120 has data waiting for. Fabric scheduler 88 informs scheduling interface 136 which egress port (or ports) has been assigned during each epoch. Interface 136 relays Epoch information to output organizer 128.

Output organizer 128 implements IWFQ scheduling. Note that although, conceptually and as shown in FIG. 6, ingress interface 120 can be thought of as having N IWFQ schedulers, in practice a single instance of scheduler hardware per switching fabric ingress port is preferred. This single instance maintains state for N IWFQ schedulers, selecting the appropriate state at each epoch for the switching fabric egress port assigned during that epoch. Output organizer 128 signals MMU 132, using the value QPtr, telling MMU 132 which queue is currently selected to supply packet data to port FIFO 134.

Figure 8:
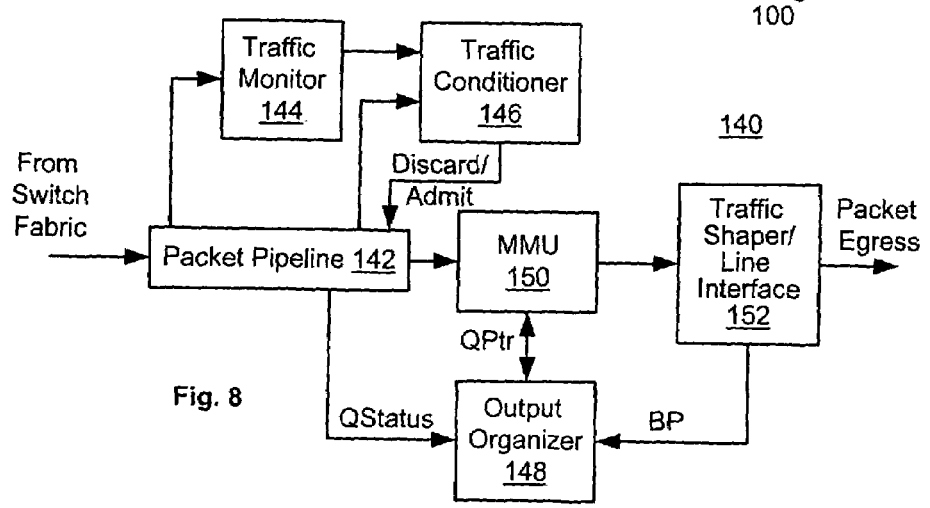
FIG. 8 shows a block diagram for a packet egress interface.

FIG. 8 shows a high-level block diagram for an egress interface 140. Egress interface 140 operates much like ingress interface 120. Packet pipeline 142 receives packets from the switching fabric, where the packets undergo traffic monitoring and traffic conditioning using traffic monitor 144 and traffic conditioner 146 via similar operations to those that are performed by traffic monitor 124 and traffic conditioner 126 while packets wait in packet pipeline 122. A packet that is not discarded from pipeline 142 is queued by MMU 150 in a queue corresponding to that packet's class and physical egress port (although egress interface 140 shows a single egress port, the egress interface may serve multiple physical ports).

Output organizer 148 determines which MMU queue will supply packets to traffic shaper/line interface 152. For output organizer 148, an "epoch" may be equated to the time necessary to output a set number of bytes from MMU 150. One typical access mode is for output organizer 148 to consider each physical egress port in round-robin fashion, selecting a traffic class for each port using IWFQ.

Output organizer 148 receives Back Pressure BP signal from traffic shaper/line interface 152 when the traffic rate from MMU 150 to a packet egress port exceeds the subscribed rate for the port. The BP signal also provides a notification to output organizer 148 when a physical egress port cannot accept more data. When BP is asserted for a given physical port, output organizer 148 will skip that port in its round-robin order.

Figure 9:
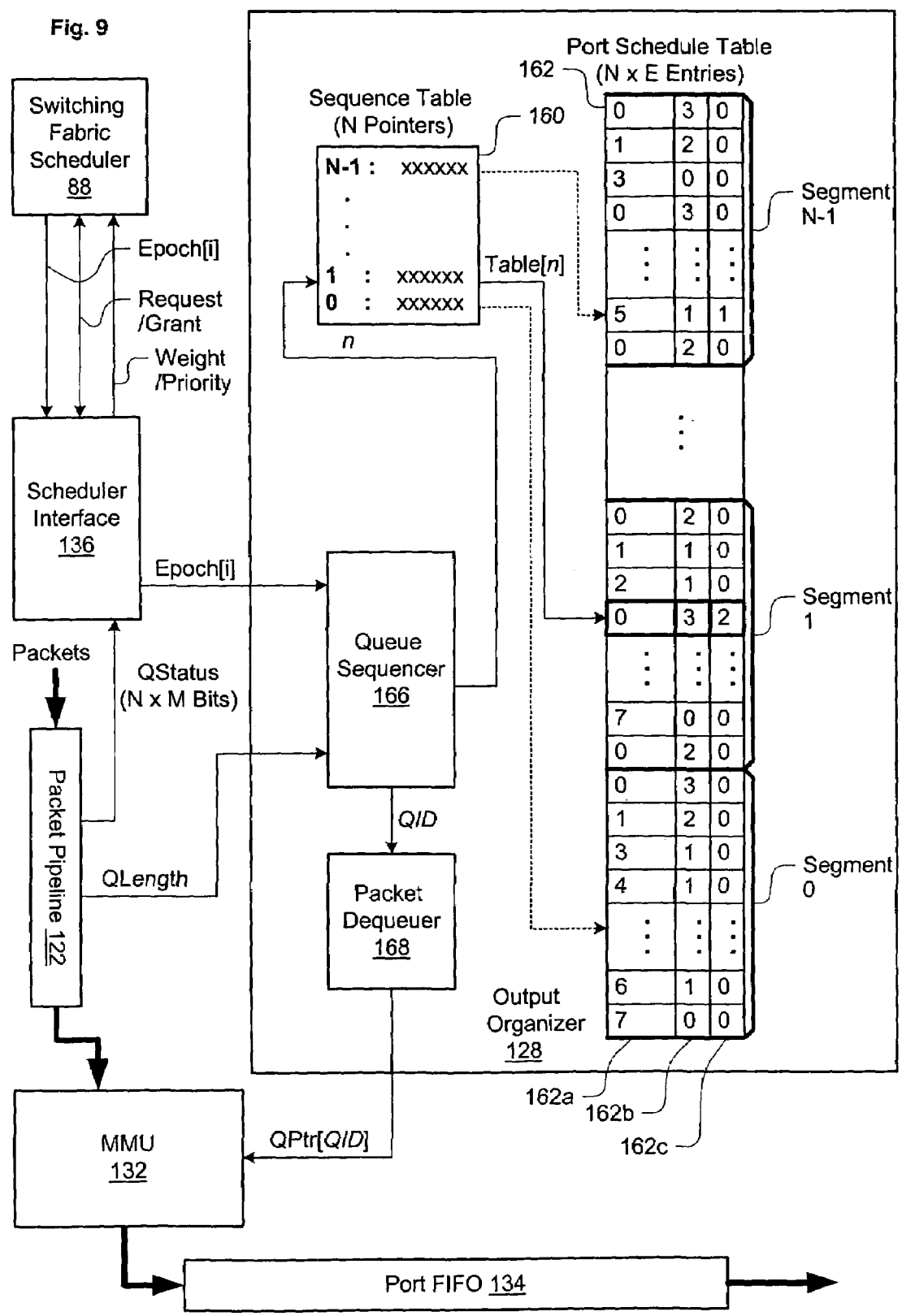
FIG. 9 shows a block diagram for an IWFQ scheduler.

FIG. 9 shows a block diagram for an output organizer 128 including an IWFQ scheduler. Organizer 128 preferably resides entirely on a single integrated circuit, with or without other neighboring components (such as packet pipeline 122) shown in FIG. 7. Queue sequencer 166 determines, for each epoch, which queue(s) will supply packets to port FIFO 134 during that epoch. Sequence table 160 and port schedule table (i.e., interleaving table) 162 aid queue sequencer 166 in this process. Packet dequeuer 168 has the task of physically dequeueing packets from MMU 132 and filling port FIFO 134 during an epoch.

Queue sequencer 166 receives, during Epoch[i-2], a description of the switching fabric configuration for Epoch[i] from scheduler interface 136. Of particular interest to queue sequencer 166 is the value Epoch[i].DestPort, which identifies the switching fabric egress port n that will connect to port FIFO 134 during Epoch[i].

During Epoch[i-1], queue sequencer 166 uses the fabric egress port value n (i.e., Epoch[i].DestPort) to access a corresponding one of the N entries in sequence table 160. Each entry in table 160 contains a pointer for a corresponding fabric egress port. The pointer indicates the current schedule entry for that port in port schedule table 162—in other words, sequence table 160 (along with column c of table 162) saves state information for each of N IWFQ schedulers that share queue sequencer 166. In FIG. 9, each pointer has a fixed offset and a variable part. The fixed offset identifies a segment of port schedule table 162 that corresponds to egress port n; the variable part stores the index of the current entry in that segment, which can be changed by queue sequencer 166 as it steps through the table.

Port schedule table 162 has N×E entries, where E is a selected number of entries used to schedule traffic for each egress port. Essentially, table 162 can be viewed as a collection of N logically separate tables, each E entries long. Generally, E must be no less than M, where M is the number of traffic classes (and therefore queues) for traffic bound for fabric egress port n. This allows each traffic class to be represented at least once in the interleaving table. E will preferably be a power of 2, as this simplifies table addressing.

In the embodiment shown in FIG. 9, each entry in table 162 consists of three fields. Field 162a contains an identifier QID for one of the M queues associated with fabric egress port N; field 162b contains a MaxEpoch value for that entry, which is an encoding of the number of epochs that that entry can monopolize port FIFO 134 before it must relinquish control; field 162c contains an EpochCtr value for that entry, representing the number of epochs that the entry has been charged for use of port FIFO 134. The MaxEpoch encoding used is the following. Bit pattern "00" represents one epoch that can be charged on the queue, "0" represents two epochs, "10" represents three epochs, and "11" represents four epochs.

Using the pointer Table[n] selected from table 160, queue sequencer 166 accesses the current entry of the port schedule table segment n (=1 in the figure). In the following, the notation Table[n].QID refers to the current queue in table segment n. Likewise, Table[n].MaxEpoch refers to the current MaxEpoch value, and Table[n].EpochCtr refers to the number of epochs that the current entry has been charged for. Generally, QID and MaxEpoch are programmable values that can be tailored to a specific service profile; EpochCtr is changed by queue sequencer 166 during operation.

The exact schedule table configuration is amenable to several different designs. In one embodiment, QID is a four-bit field, and MaxEpoch and EpochCtr are both two-bit fields. Note that if E=M, it may be possible to operate with no QID field at all, since the table index itself can be made to correlate with the queue identifier. On the other extreme, if a constant MaxEpoch value (e.g., one epoch as in FIG. 2) is suitable for each entry, the MaxEpoch field may be dispensed with. And depending on the method of operation, it may or may not be possible to dispense with an EpochCtr field associated with each entry.

Queue sequencer 166 supplies a value QID to packet dequeuer 168, indicating which of the N×M queues is scheduled to supply packets to the switching fabric during this epoch. QID typically changes every epoch, and can change within an epoch if queue QID is completely emptied.

Packet dequeuer 168 maintains a size-N×M array of addresses QPtr[] into MMU 132, each address indicating the location in memory 132 of the packet at the head of a corresponding queue. At Epoch[i-1], dequeuer 168 uses QPtr[QID] to dequeue packets from queue QID of MMU 132 and place them in port FIFO 134.

The above description can also apply to output organizer 148 of FIG. 8. The primary differences are a definition of an epoch that is different from a switching fabric epoch, and the use of a round robin scheduler with backpressure signaling BP instead on scheduler interface 136. Whereas in an ingress implementation, the epoch size is the epoch size of the switching fabric (e.g., 10 microseconds), in an egress implementation, the epoch size may be more appropriately keyed to characteristics of the physical egress port. For instance, if the MTU (Maximum Transmission Unit, i.e., maximum packet size) of a link is known, it may be appropriate to set the epoch length to the amount of time required to place an integer number of MTU-sized packets on the link.

Figure 10:
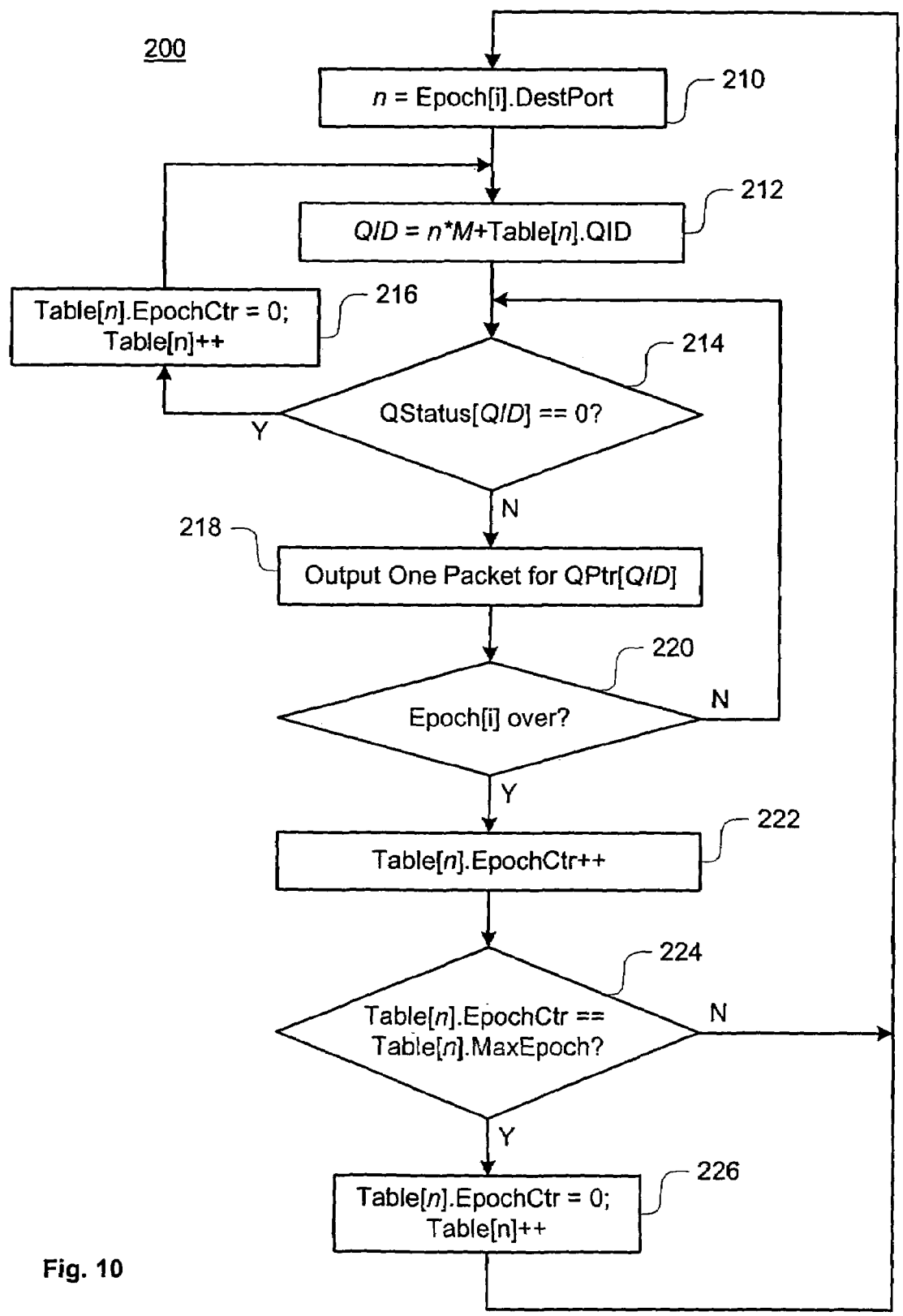
FIG. 10 contains a flowchart for operation of an IWFQ scheduler according to one embodiment.

FIG. 10 contains a flowchart 200 illustrating one method of operation for an IWFQ scheduler such as the one implemented in output organizer 128. Referring first to block 210, a notification is received from switching fabric scheduler 88 of a DestPort for epoch i. A register n is set to Epoch[i].DestPort. Block 212 determines the offset of the current QID by adding a base offset and a lookup table value. The base offset is the offset to the first of the M queues serving destination port n. The lookup table value Table[n].QID is calculated from two lookups. The first lookup of element n in sequence table 160 returns a pointer Table[n] into port schedule table 162. This pointer is used to retrieve the QID entry pointed to by Table[n].

Decision block 214 checks the status bit QStatus[QID] for QID. If QStatus[QID] is 1, queue QID has data to transmit this epoch, and control passes to block 218. If QStatus[QID] is 0, queue QID has no data to transmit. In such a case, block 216 switches scheduling to the next element in Table[n]. Block 216 first zeros the EpochCtr for the current element, and then increments the pointer Table[n] to the next table element. Block 218 outputs the packet waiting at the head of queue QID (the packet at queue memory address QPtr[QID]) to port FIFO 134. Block 220 then consults a timing estimator to determine the time left until Epoch[i]. If sufficient time remains before Epoch[i] to add another packet (and FIFO 134 is not yet full), control is transferred back to block 214.

Once the current epoch ends, block 222 increments the EpochCtr for the current table entry. Block 224 then checks EpochCtr against the MaxEpoch value for the current table entry—if equal, the current entry has used is current allotment of epochs. In such a case, block 226 first zeros the EpochCtr for the current element, and then increments the pointer Table[n] to the next table element. In either case of block 224, control is eventually transferred back up to block 210 to begin processing for the next epoch.

Figure 11:
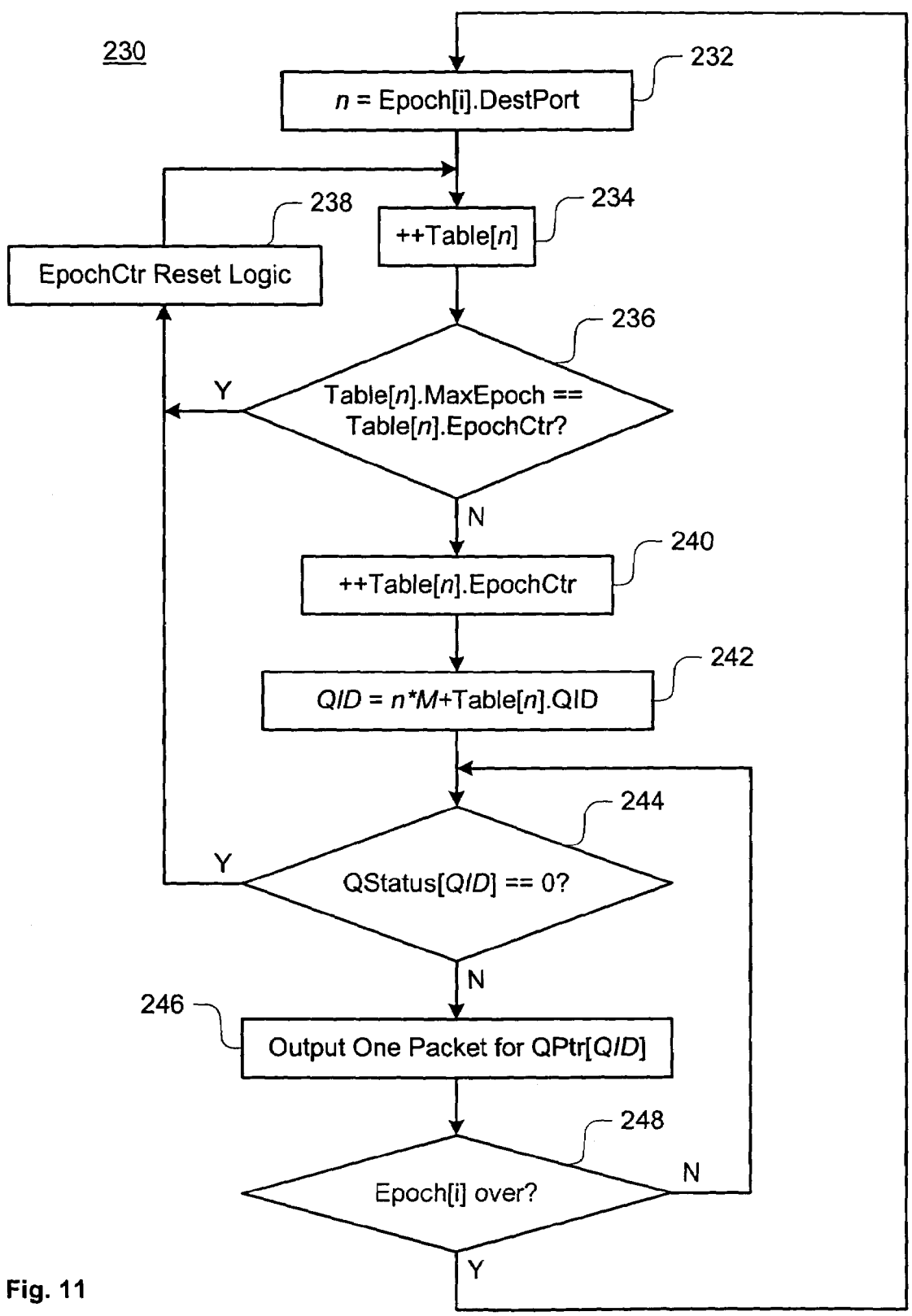
FIG. 11 contains a flowchart for operation of an IWFQ scheduler according to another embodiment.

According to FIG. 10, each interleaving table entry remains active for a corresponding number of epochs (which can be programmed on an entry-by-entry basis) referring to that table for sequencing. Other methods of using an interleaving table within the scope of the invention exist. For instance, FIG. 11 contains a flowchart 230 for a method that selects a new table entry each epoch, from among the table entries that have not yet used their programmed maximum number of epochs.

Referring first to block 232, a notification is received, from switching fabric scheduler 88, of an EgressPort for epoch i. A register n is set to Epoch[i].DestPort. At block 234, a candidate table entry for the current epoch is selected by incrementing Table[n].

At decision block 236, the pointer Table[n] has been used to retrieve the port schedule table entry for egress port n. If Table[n].EpochCtr has previously counted up to Table[n].MaxEpoch, this indicates that the table entry has used all of its allotted epochs, and thus control is transferred to block 238. Otherwise, Table[n].QID is the appropriate queue for the current epoch, and control is passed to block 240.

At block 240, the queue sequencer charges the current table entry for use of the epoch, by incrementing Table[n].EpochCtr. Next, block 242 concatenates the DestPort n and current queue identifier Table[n].QID to form a QID representing one of the N×M queues.

Decision block 244 checks the status bit QStatus[QID] corresponding to queue QID. If QStatus[QID] is 0, queue QID has no data to transmit. In such a case, scheduling can switch to the next valid element in Table[n], after passing through EpochCtr Reset Logic 238. If queue QID does have data to transmit, control is transferred to block 246.

Block 246 outputs the packet waiting at the head of queue QID (the packet at queue memory address QPtr[QID]) to port FIFO 134. Block 248 consults a timing estimator to determine the time left until Epoch[i]. If sufficient time remains before Epoch[i] to add another packet (and FIFO 134 is not yet full), control is transferred back to block 244. Otherwise, control is transferred back to block 232, and processing begins for the next epoch.

In operation according to FIG. 10, the queue sequencer loops repeatedly through the table entries, using each entry once during each loop. Once an entry has been used for its designated MaxEpoch loops, that entry gets skipped on successive loops. Thus on each loop, fewer and fewer entries will generally be valid on that loop. After the entry (or entries) having the largest MaxEpoch values have been used for MaxEpoch loops, the table is used up and must be reset. EpochCtr Reset Logic 238 detects when the table is used up, e.g., by counting the number of times that block 238 is reached in a single epoch, and when that count reaches the number of table entries, resetting the table. The table can be reset by setting EpochCtr for each table entry back to 0.

Note that block 240 could be placed after block 246 (and only incremented once per epoch), such that a table entry will not be charged for use of an epoch unless it actually queues a packet during that epoch. This would allow a table entry that corresponds to a given queue to be bypassed on one loop if it has no data, and then revisited on a subsequent loop. In this respect, this embodiment can exhibit a somewhat flexible queue selection order.

It is noted that IWFQ can be implemented on a per-flow basis. For example, the interleaving table can be designed to accommodate a fixed maximum number of flows, by associating a flow identifier with each table entry. If a flow identifier corresponding to a table entry is unassigned, that entry is skipped during sequencing until it is assigned.

Although the above description focuses on a hardware implementation, the described methods are also appropriate for software implementation. As such, the scope of the present invention extends to an apparatus comprising a computer-readable medium containing computer instructions that, when executed, cause a processor or multiple communicating processors to perform one of the described methods.

One of ordinary skill in the art will recognize that the concepts taught herein can be tailored to a particular application in many other advantageous ways. The pipelining concepts described herein are merely one approach to a scheduling implementation, and others are possible. Where one table entry is "used up" before scheduling passes to the next entry, EpochCtr can be a single register that is re-used at each table entry. With an embodiment such as this, it may also be possible for several sets of queues to share a common interleaving table, each set of queues maintaining its own EpochCtr and pointer into the table. It is equivalent to set EpochCtr using MaxEpoch, and then count down to zero, or to start EpochCtr at zero, and count up towards MaxEpoch. MaxEpoch could be a relative number, e.g., a differential offset to a base number of epochs assigned for each traffic class. The number of table entries, as well as the bit range of MaxEpoch (when used), are design parameters. The tables themselves may reside on a memory that is physically separate (e.g., a memory chip) from the sequencing logic. A "next" table entry need not be physically adjacent—it is sufficient that an algorithm exists for determining which entry is next in sequence.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of scheduling packets from multiple queues onto a common output packet stream, wherein the common output packet stream serves multiples sets of queues, the method comprising:

maintaining a programmable interleaving table having multiple entries, each entry identifying one of the queues with an epoch value, each set of queues having its own programmable interleaving table;

maintaining a separate pointer for each set of queues to a current table entry in the programmable interleaving table for that set of queues;

selecting, for each epoch in the sequence of epochs, one of the sets of queues for packet scheduling during that epoch;

selecting the pointer corresponding to the selected set of queues for use during that epoch;

scheduling packets onto the output packet stream from the queue identified with the current table entry of the selected pointer, and charging that entry for use of the epoch; and moving the pointer to a next table entry when the current table entry has been charged with use of a number of epochs set aside for that entry.

2. The method of claim 1, wherein the number of entries in the programmable interleaving table exceeds the number of queues, such that at least some queues are identified more than once in the table, each entry containing a field explicitly identifying the queue associated with that entry.

3. The method of claim 2, wherein the epoch value for each entry is a common value shared by all entries.

4. The method of claim 2, wherein the epoch value for each entry is based on the queue identified with the entry.

5. The method of claim 2, wherein the epoch value for each entry is a programmable value occupying a field of that entry.

6. The method of claim 2, wherein each entry comprises an epoch counter field, and wherein charging an entry for use of an epoch comprises changing the value of the epoch counter field by one.

7. A method of scheduling packets from multiple queues onto a common output packet stream, the method comprising:

maintaining a programmable interleaving table having multiple entries, each entry identifying one of the queues with an epoch value, each entry comprising an epoch counter field, wherein the number of entries in the programmable interleaving table exceeds the number of queues, such that at least some queues are identified more than once in the table, each entry containing a field explicitly identifying the queue associated with that entry;

maintaining a pointer to a current table entry in the programmable interleaving table;

for each epoch in a sequence of epochs, scheduling packets onto the output packet stream from the queue identified with the current table entry, and charging that entry for use of the epoch by changing the value of the epoch counter field by one; and moving the pointer to a next table entry when the current table entry has been charged with use of a number of epochs set aside for that entry, wherein moving the pointer to a next table entry when the current table entry has been charged with use of a number of epochs set aside for that entry comprises moving the pointer after the value in the epoch counter has been changed a number of times corresponding to the current table entry's epoch value.

8. A method of scheduling packets from multiple queues onto a common output packet stream, the method comprising:

maintaining a programmable interleaving table having multiple entries, each entry identifying one of the queues with an epoch value, each entry comprising an epoch counter field, wherein the number of entries in the programmable interleaving table exceeds the number of queues, such that at least some queues are identified more than once in the table, each entry containing a field explicitly identifying the queue associated with that entry;

maintaining a pointer to a current table entry in the programmable interleaving table;

for each epoch in a sequence of epochs, scheduling packets onto the output packet stream from the queue identified with the current table entry, and charging that entry for use of the epoch by changing the value of the epoch counter field by one; and moving the pointer to a next table entry when the current table entry has been charged with use of a number of epochs set aside for that entry, wherein moving the pointer to a next table entry when the current table entry has been charged with use of a number of epochs set aside for that entry comprises moving the pointer after each epoch to the next table entry that has not yet changed the value of its epoch counter field a number of times corresponding to that entry's epoch value.

9. The method of claim 8, wherein when all table entries have been charged with use of a number of epochs corresponding to their respective epoch values, re-initializing each epoch counter field and setting the pointer to point to the head of the table.

10. The method of claim 2, wherein when the pointer is moved to a next table entry an epoch register is initialized, wherein charging an entry for use of an epoch comprises changing the value of the epoch register by one, and wherein moving the pointer to a next table entry when the current table entry has been charged with use of a number of epochs set aside for that entry comprises moving the pointer after the value in the epoch register has been changed a number of times corresponding to the current table entry's epoch value.

11. The method of claim 2, wherein when the queue identified with the current table entry is empty and the epoch has not yet ended, moving the pointer to the next table entry that is not empty, and scheduling packets onto the output packet stream from the queue identified with that next table entry for the remainder of the epoch.

12. The method of claim 11, wherein when the pointer is moved during an epoch, only the first table entry of the epoch is charged for use of the epoch.

13. A method of scheduling packets from multiple queues onto a common output packet stream, the method comprising:

maintaining a programmable interleaving table having multiple entries, each entry identifying one of the queues with an epoch value, wherein the number of entries in the programmable interleaving table equals the number of queues, wherein each entry comprises an epoch value field and an epoch counter field;

maintaining a pointer to a current table entry in the programmable interleaving table;

for each epoch in a sequence of epochs scheduling packets onto the output packet stream from the queue identified with the current table entry and charging that entry for use of the epoch, wherein charging an entry for use of an epoch comprises changing the value of that field's epoch counter by one; and moving the pointer to a next table entry when the current table entry has been charged with use of a number of epochs set aside for that entry, wherein moving the pointer to a next table entry when the current table entry has been charged with use of a number of epochs set aside for that entry comprises moving the pointer, after each epoch, to the next table entry that has not yet changed the value of its epoch counter field a number of times corresponding to that entry's epoch value.

14. An integrated circuit having a scheduler comprising:
a programmable interleaving table having multiple entries, each entry identifying a queue with an epoch value;
a pointer register identifying a current entry in the interleaving table; and
a queue sequencer to supply, for each epoch, a queue identifier based on the current entry in the programmable interleaving table, to charge the current entry for use of the epoch, and to step the pointer register to a next table entry when the current entry has been charged with use of a number of epochs set aside for that entry wherein the queue sequencer has access to a queue status register that indicates whether each queue identified in the programmable interleaving table is empty or not, the queue sequencer using the queue status register contents to step the pointer register to a next table entry within an epoch, when the queue status of the queue identified with the current entry indicates that that queue is empty.

15. The circuit of claim 14, wherein the pointer register comprises multiple pointer entries, each pointer entry identifying a current entry, in the programmable interleaving table, corresponding to that pointer entry.

16. The circuit of claim 15, wherein the programmable interleaving table comprises multiple interleaving table segments, each pointer entry identifying table entries within a corresponding one of the interleaving table segments.

17. An apparatus comprising a computer-readable medium containing computer instructions that, when executed, cause a processor or multiple communicating processors to perform a method for scheduling packets from multiple queues onto a common output packet stream, wherein the common output packet stream serves multiples sets of queues the method comprising:
maintaining a programmable interleaving table having multiple entries, each entry identifying one of the queues with an epoch value, each set of queues having its own programmable interleaving table;
maintaining a separate pointer for each set of queues to a current table entry in the programmable interleaving table for that set of queues;
selecting, for each epoch in the sequence of epochs, one of the sets of queues for packet scheduling during that epoch;
selecting the pointer corresponding to the selected set of queues for use during that epoch;
scheduling packets onto the output packet stream from the queue identified with the current table entry of the selected pointer, and charging that entry for use of the epoch; and
moving the pointer to a next table entry when the current table entry has been charged with use of a number of epochs set aside for that entry.

18. The apparatus of claim 17, wherein the number of entries in the programmable interleaving table exceeds the number of queues, such that at least some queues are identified more than once in the table, each entry containing a field explicitly identifying the queue associated with that entry.

19. The apparatus of claim 18, wherein the epoch value for each entry is a programmable value occupying a field of that entry.

20. The apparatus of claim 19, wherein each entry comprises an epoch counter field, and wherein charging an entry for use of an epoch comprises changing the value of the epoch counter field by one.

21. An apparatus comprising a computer-readable medium containing computer instructions that, when executed, cause a processor or multiple communicating processors to perform a method for scheduling packets from multiple queues onto a common output packet stream, the method comprising:
maintaining a programmable interleaving table having multiple entries, each entry identifying one of the queues with an epoch value, each entry comprising an epoch counter field, wherein the number of entries in the programmable interleaving table exceeds the number of queues, such that at least some queues are identified more than once in the table, each entry containing a field explicitly identifying the queue associated with that entry;
maintaining a pointer to a current table entry in the programmable interleaving table;
for each epoch in a sequence of epochs, scheduling packets onto the output packet stream from the queue identified with the current table entry, and charging that entry for use of the epoch by changing the value of the epoch counter field by one; and
moving the pointer to a next table entry when the current table entry has been charged with use of a number of epochs set aside for that entry, wherein moving the pointer to a next table entry when the current table entry has been charged with use of a number of epochs set aside for that entry comprises moving the pointer after the value in the epoch counter has been changed a number of times corresponding to the current table entry's epoch value.

22. An apparatus comprising a computer-readable medium containing computer instructions that, when executed, cause a processor or multiple communicating processors to perform a method for scheduling packets from multiple queues onto a common output packet stream, the method comprising:
maintaining a programmable interleaving table having multiple entries, each entry identifying one of the queues with an epoch value, each entry comprising an epoch counter field, wherein the number of entries in the programmable interleaving table exceeds the number of queues, such that at least some queues are identified more than once in the table, each entry containing a field explicitly identifying the queue associated with that entry;
maintaining a pointer to a current table entry in the programmable interleaving table;
for each epoch in a sequence of epochs, scheduling packets onto the output packet stream from the queue identified with the current table entry and charging that entry for use of the epoch by changing the value of the epoch counter field by one; and
moving the pointer to a next table entry when the current table entry has been charged with use of a number of epochs set aside for that entry, wherein moving the pointer to a next table entry when the current table entry has been charged with use of a number of epochs set aside for that entry comprises moving the pointer after each epoch to the next table entry that has not yet changed the value of its epoch counter field a number of times corresponding to that entry's epoch value.

23. The apparatus of claim 22, wherein when all table entries have been charged with use of a number of epochs corresponding to their respective epoch values, re-initializing each epoch counter field and setting the pointer to point to the head of the table.

24. The apparatus of claim 18, wherein when the queue identified with the current table entry is empty and the epoch has not yet ended, moving the pointer to the next table entry that is not empty, and scheduling packets onto the output packet stream from the queue identified with that next table entry for the remainder of the epoch.

25. The apparatus of claim 17, wherein the number of entries in the programmable interleaving table equals the number of queues, wherein each entry comprises an epoch value field and an epoch counter field, wherein charging an entry for use of an epoch comprises changing the value of that field's epoch counter by one, and wherein moving the pointer to a next table entry when the current table entry has been charged with use of a number of epochs set aside for that entry comprises moving the pointer, after each epoch, to the next table entry that has not yet changed the value of its epoch counter field a number of times corresponding to that entry's epoch value.

* * * * *